(12) United States Patent
Wang et al.

(10) Patent No.: US 11,901,755 B2
(45) Date of Patent: Feb. 13, 2024

(54) PORTABLE CHARGING CASE

(71) Applicant: Shenzhen Olight E-Commerce Technology Co., Ltd., Guangdong (CN)

(72) Inventors: Yueming Wang, Hunan (CN); Shiyue Wu, Guangdong (CN); Le Jiang, Hunan (CN); Si Wei, Guangxi (CN)

( * ) Notice: Subject to any disclaimer, the term of this patent is extended or adjusted under 35 U.S.C. 154(b) by 218 days.

(21) Appl. No.: 17/488,329

(22) Filed: Sep. 29, 2021

(65) Prior Publication Data

US 2022/0021229 A1    Jan. 20, 2022

(30) Foreign Application Priority Data

Aug. 17, 2021   (CN) .......................... 202110940432.0

(51) Int. Cl.
*H02J 7/00*        (2006.01)
*F21L 4/08*        (2006.01)

(52) U.S. Cl.
CPC .......... *H02J 7/0045* (2013.01); *H02J 7/0047* (2013.01); *F21L 4/085* (2013.01)

(58) Field of Classification Search
CPC .................................................... H02J 7/0042
See application file for complete search history.

(56) References Cited

U.S. PATENT DOCUMENTS

| 6,186,634 | B1* | 2/2001 | Pitts | ........................ | F21V 13/14 |
| | | | | | 362/208 |
| 2001/0004318 | A1* | 6/2001 | Pitts | ........................ | F21L 4/085 |
| | | | | | 362/183 |
| 2001/0028561 | A1* | 10/2001 | Pitts | ........................ | H01J 61/44 |
| | | | | | 362/154 |
| 2008/0111425 | A1* | 5/2008 | Chang | ........................ | H02J 9/02 |
| | | | | | 362/183 |
| 2010/0090645 | A1* | 4/2010 | Huang | .................. | H02J 7/0045 |
| | | | | | 320/110 |
| 2019/0230985 | A1* | 8/2019 | Chan | ..................... | H02J 7/0044 |

FOREIGN PATENT DOCUMENTS

| CN | 207074869 U | * | 3/2018 |
| CN | 214369418 U | * | 10/2021 |
| CN | 113764804 A | * | 12/2021 |

(Continued)

OTHER PUBLICATIONS

CN-113764804 translation, Zhuang, A Battery Adapting Device For Hand-held LED Illuminating Lamp (Year: 2021).*

(Continued)

*Primary Examiner* — Drew A Dunn
*Assistant Examiner* — Tynese V McDaniel

(57) ABSTRACT

A portable charging case, including an unlocking assembly and a push rod, user can push the unlocking assembly in the direction towards the storage space after the portable lighting device is fully charged. The push rod then pushes the magnetic charging device away from the portable lighting device so that the magnetic charging device disconnects from the portable lighting device. Users can take the portable lighting device out from the charging case more quickly and easily, thereby enhancing user experience for using the charging case.

10 Claims, 8 Drawing Sheets

(56) References Cited

FOREIGN PATENT DOCUMENTS

DE       202021000914 U1 *  5/2021   .............. F21L 4/085
WO    WO-2022248857 A1 * 12/2022

OTHER PUBLICATIONS

CN-207074869 translation, Gao, Mobile Power Supply Charging Device (Year: 2018).*
DE-202021000914 translation, Charging Case For A Flashlight (Year: 2021).*
CN-214369418 translation, Hu, Pressing Ejection Type Flashlight Charging Chamber (Year: 2021).*

* cited by examiner

PORTABLE CHARGING CASE

BACKGROUND OF THE INVENTION

The present invention relates to charging apparatus and more particularly pertains to a portable charging case.

Portable lighting devices are widely used in our daily lives. Traditional portable lighting devices need to connect external power supply via charging apparatus for charging, and therefore cannot be hand-carried when charging. In light of this technical issue, portable lighting devices are equipped with charging cases. Users can put the portable lighting device into the charging case for charging and carry the charging case for further use. Although charging cases solve the problem of charging portable lighting devices, the charging cases now present are still not convenient enough for users; this is because elastic components provided in the case, which strengthens the stability of charging when the portable lighting device is charging in the charging case, make it difficult for users to take out the portable lighting device from the charging case after charging.

BRIEF SUMMARY OF THE INVENTION

In view of the aforesaid disadvantages now present in the prior art, the present invention provides a portable charging case which allows rapid and convenient removal of the portable lighting device from the charging case after charging the portable lighting device, thereby enhancing user experience for using the charging case.

To attain this, the present invention adopts the following technical solutions:

A portable charging case, which comprises:
   a case;
   an inner lining provided with a storage space for receiving a portable lighting device provided along a longitudinal direction thereof;
   a lid provided on the case in an openable and closable manner;
   an energy storage device installed in the case for supplying electricity to the portable lighting device;
   a magnetic charging device installed in the case by mean of a first elastic component and located at a first end of the inner lining;
   a pair of unlocking assemblies movably installed on the inner lining and located on two sides of the storage space respectively; the unlocking assemblies can move towards an inner side of the storage space under external force;
   a pair of push rods movably installed in a pair of through holes at two sides of the inner lining respectively along the longitudinal direction of the inner lining, and each of the push rods has a first end which is close to the unlocking assemblies and a second end which can press against the magnetic charging device; the first end and the second end of each of the push rods are opposite to each other;
   when the unlocking assemblies are pushed, the unlocking assemblies can press against the push rods to push the magnetic charging device to move away from the portable lighting device.

Furthermore, the unlocking assemblies each comprises a sliding piece and a second elastic component; a pair of installation slots are provided on the inner lining; a side of each of the sliding pieces which is near to the storage space is fixed to a side wall of a respective one of the installation slots by means of a respectively one of the second elastic components, thereby allowing the sliding piece to move towards the storage space under external force.

Furthermore, a first inclining part is extended from each of the sliding pieces towards the push rods; correspondingly, a second inclining part is provided at the first end of each of the push rods which is close to the sliding pieces; wherein, when the sliding pieces are pushed towards the storage space, the first inclining parts can press against the second inclining parts to allow the push rods to push the magnetic charging device away from the portable lighting device.

Furthermore, a pair of recessed areas are provided on the inner lining; the recessed areas are located at the two sides of the storage space; the installation slots are located in the recessed areas.

Furthermore, an opening part is provided on a second end of the inner lining; the opening part corresponds to a light-emitting end of the portable lighting device in position, size and shape; the second end of the inner lining is opposite to the first end thereof.

Furthermore, a control switch is provided on the case; the control switch is signally connected to the magnetic charging device to allow the control switch to control operation of the portable lighting device stored in the case.

Furthermore, the case is further provided with a temperature sensor for sensing temperature inside the case; the temperature sensor is signally connected to the magnetic charging device.

Furthermore, a buffer unit is further provided in the storage space; the buffer unit is located at the opening part.

Furthermore, one end of the lid which is away from the case is provided with a first magnetic part; a second magnetic part is correspondingly provided on the case; the first magnetic part and the second magnetic part cooperate with each other so that the lid closes on the case.

Furthermore, a circlip is fixed on each of the push rods; each of the push rods is further sleeved with a third elastic component; each of the third elastic components has a first end which is fixed to a respective one of the circlips and a second end which is fixed to an inner wall of a respective one of the through holes.

The benefits of this invention are as follows:

With the provision of the unlocking assembly and the push rod, after the portable lighting device is fully charged, user only need to push the unlocking assembly in the direction towards the storage space and the push rod would then push the magnetic charging device away from the portable lighting device to disconnect the magnetic charging device from the portable lighting device. User can take the portable lighting device out from the charging case more quickly and easily, thereby enhancing user experience for using the charging case.

Figure 1:
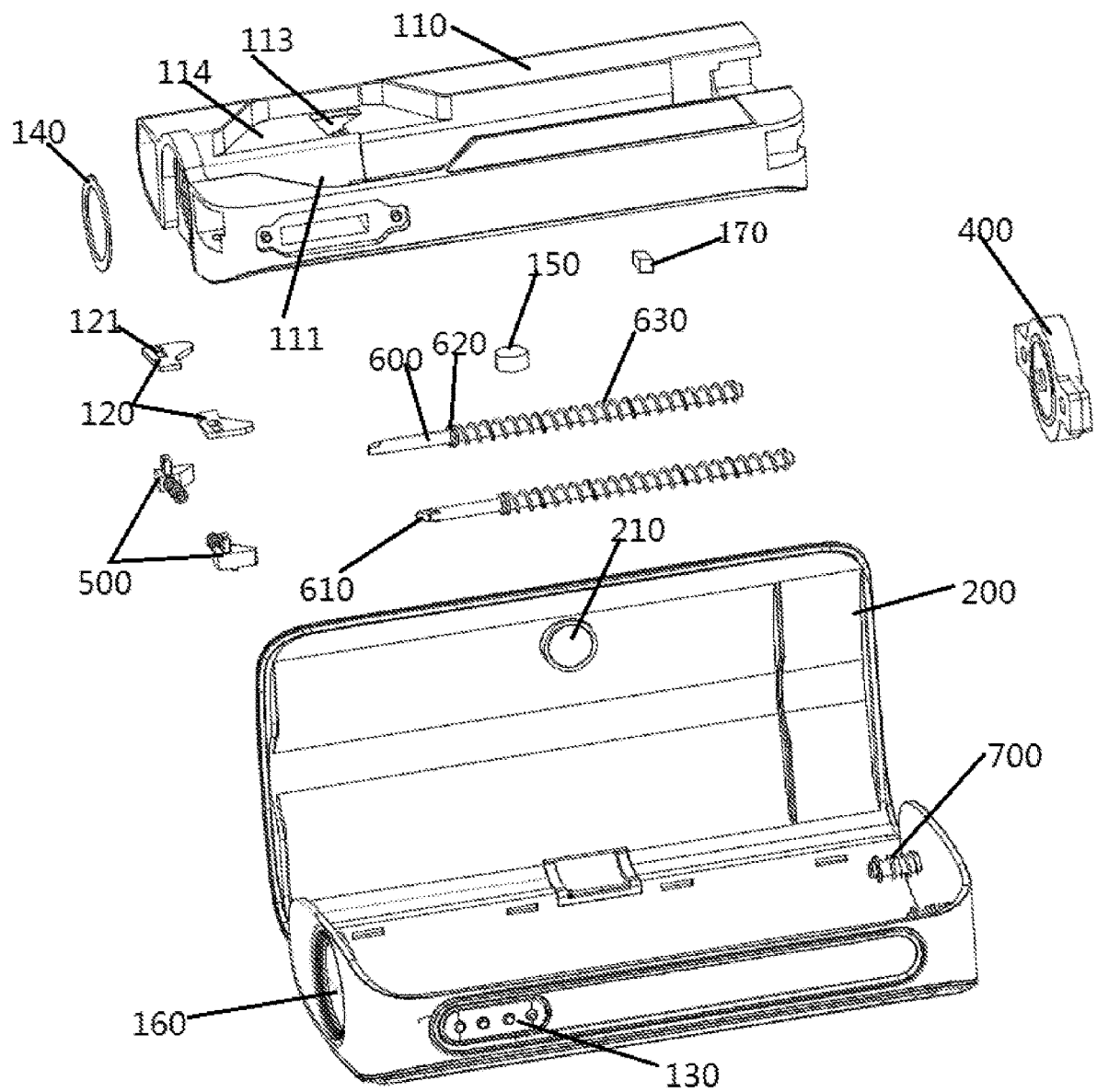
FIG. 1 shows the exploded view of the present invention.

In the figures: 100 denotes the case, 110 denotes the inner lining, 111 denotes the storage space, 112 denotes the through hole, 113 denotes the installation slot, 114 denotes the recessed area, 115 denotes the opening part, 120 denotes the protection cover, 121 denotes the sliding slot, 130 denotes the control switch, 140 denotes the buffer unit, 150 denotes the second magnetic part, 160 denotes the light-emitting area, 170 denotes the temperature sensor, 200 denotes the lid, 210 denotes the first magnetic part, 300 denotes the energy storage device, 400 denotes the magnetic charging device, 500 denotes the unlocking device, 510 denotes the sliding piece, 511 denotes the first inclining part, 512 denotes the moving part, 520 denotes the second elastic component, 600 denotes the push rod, 610 denotes the second inclining part, 620 denotes the circlip, 630 denotes the third elastic component, 700 denotes the first elastic component, 800 denotes the wireless charging component and 900 denotes the portable lighting device.

DETAILED DESCRIPTION OF THE INVENTION

Some embodiments of the present invention are further described in detail below. The embodiments are illustrated in the figures. Identical or like references throughout the description and the figures represent identical or like components or components having the same or similar functions. The embodiments described below with reference to the figures should be considered illustrative for the purpose of explaining the present invention, and should not be considered as any limitation to the present invention.

In the present invention, it should be noted that directions or positional relationships indicated by terms such as "length", "width", "upper", "lower", "front", "rear", "left", "right", "vertical", "horizontal", "top", "bottom", "inner", "outer" should be understood based on the directions or positional relationships according to the figures, and should also be understood as merely means for simplification for the sake of easier illustration of the present invention. It is not meant or intended to mean that the devices or components concerned should have such specifically described directions, or should be configured or operated according to the specifically described directions, and hence should not be considered as any limitation to the present invention.

Further, terms like "first", "second" are used for illustrative purpose, and should not be understood as meaning or implying relative importance or as a subtle indication of a quantity of the described technical feature. Therefore, a feature defined by "first" or "second" may comprise, by obvious indication or subtle implication, one or more than one of said feature in terms of quantity. In the description, "a plurality of" means a quantity of two or above, unless otherwise specified.

In the present invention, unless otherwise specified, terms such as "install", "connect", "communicate" and "fix" should be understood broadly. For example, a fixed connection, a removable connection, or integral formation may be intended. Further, connection may be mechanical or electrical, direct or indirect through a medium, and may be an internal communication between two components or an interactive relationship between two components. A person skilled in this field of art should be able to understand the specific meaning of the terms described in the present invention according to the context of the practical situation described.

As illustrated in FIGS. 1 to 9, a portable charging case comprises:
 a case 100;
 an inner lining 110 provided with a storage space 111 for receiving a portable lighting device 900 provided along a longitudinal direction thereof;
 a lid 200 provided on the case 100 in an openable and closable manner;
 an energy storage device 300 installed in the case 100 for supplying electricity to the portable lighting device 900;
 a magnetic charging device 400 installed in the case 100 by mean of a first elastic component 700 and located at a first end of the inner lining 110;
 a pair of unlocking assemblies 500 movably installed on the inner lining 110 and located on two sides of the storage space 111; the unlocking assemblies 500 can move towards an inner side of the storage space 111 under external force;
 a pair of push rods 600 movably installed in a pair of through holes 112 at two sides of the inner lining 110 respectively along the longitudinal direction of the inner lining 110, and the push rods 600 each has a first end which is close to the unlocking assemblies 500 and a second end which can press against the magnetic charging device 400; the first end and the second end of each of the push rods 600 are opposite to each other;
 when the unlocking assemblies 500 are pushed, the unlocking assemblies 500 can press against the push rods 600 to push the magnetic charging device 400 to move away from the portable lighting device 900.

Figure 2:
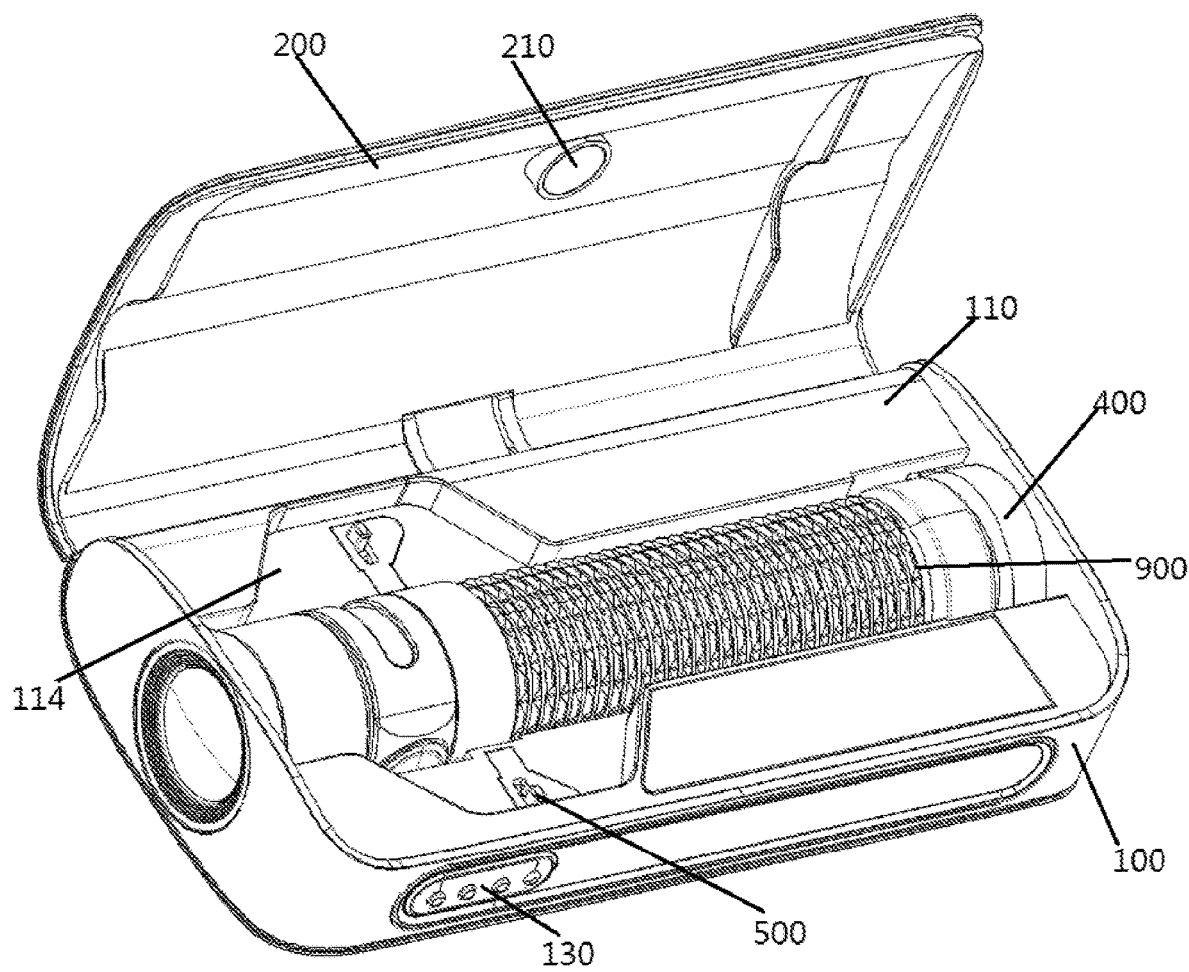
FIG. 2 shows the structural view of the charging case with the portable lighting device being placed inside.
Figure 3:
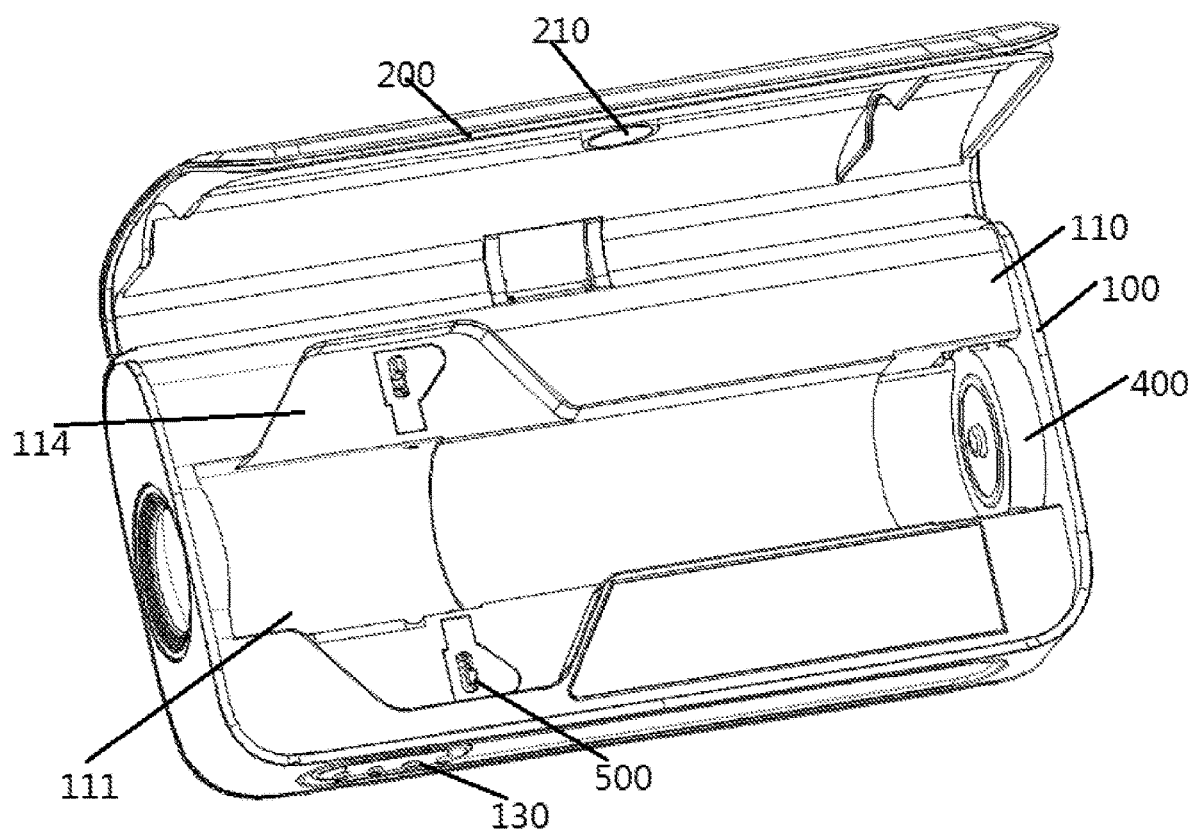
FIG. 3 shows the structural view of the present invention.

As illustrated in FIGS. 2 and 3, in this embodiment, the unlocking assemblies 500 each comprises a sliding piece 510 and a second elastic component 520. A pair of installation slots 113 are provided on the case 100. A side of the sliding piece 510 which is near to the storage space 111 is fixed to a side wall of the installation slot 113 by means of the second elastic component 520, thereby allowing the sliding piece 510 to move towards the storage space 111 under external force. Furthermore, a protection cover 120 is provided on an upper opening of each of the installation slots 113.

Figure 9:
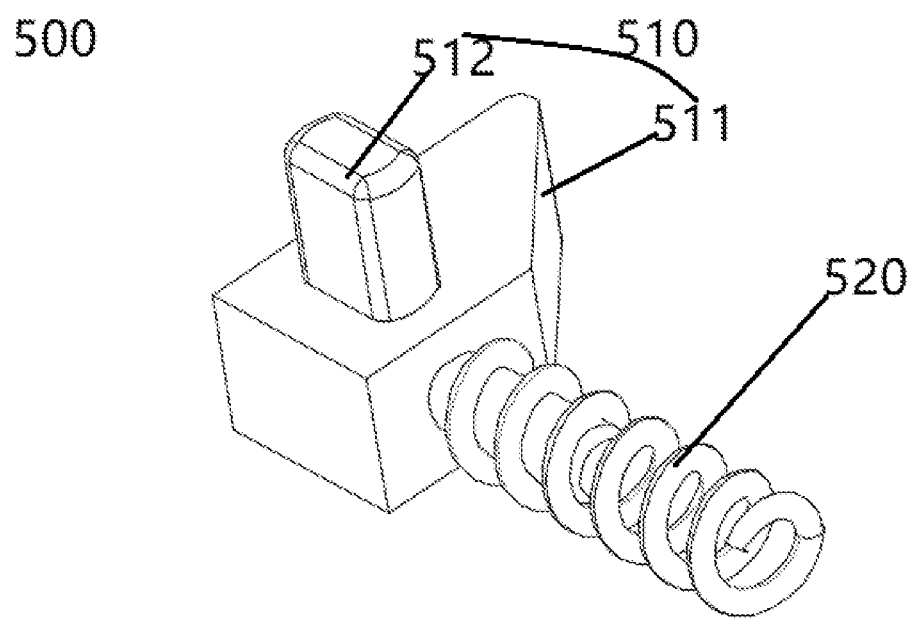
FIG. 9 shows the structural view of the unlocking assembly.

As illustrated in FIG. 9, in this embodiment, a first inclining part 511 is extended from each of the sliding pieces 510 towards the push rods 600; correspondingly, a second inclining part 610 is provided at the first end of each of the push rods 600 which is close to the sliding pieces 510. When the sliding pieces 510 are pushed towards the storage space 111, the first inclining parts 511 can press against the second inclining parts 610 to allow the push rods 600 to push the magnetic charging device 400 away from the portable lighting device 900. Furthermore, a moving part 512 is provided on each of the sliding pieces 510 in a direction towards the upper opening of the installation slots 113. A sliding slot 121 is provided on each of the protection covers. The moving parts 512 pass through the sliding slots 121 to be positioned outside the installation slots 113.

In this embodiment, a circlip 620 is fixed on each of the push rods 600. Each of the push rods 600 is further sleeved with a third elastic component 630. Each of the third elastic components 630 has a first end which is fixed to a respective one of the circlips 620 and a second end which is fixed to an inner wall of the through hole 112, so that the circlips 620 fixed on the push rods 600 compress the third elastic components 630 when the push rods 600 move towards the magnetic charging device 400, and the push rods 600 automatically return to their original positions under action of the third elastic components 630 when the sliding pieces are released.

In this embodiment, a pair of recessed areas 114 are provided on the inner lining 110. The recessed areas 114 are located at the two sides of the storage space 111. The installation slots 113 are located in the recessed areas 114. With the presence of the recessed areas 114, user may put his hand on the recessed areas 114, and so user can easily take the portable lighting device 900 out from the storage space 111.

Figure 4:
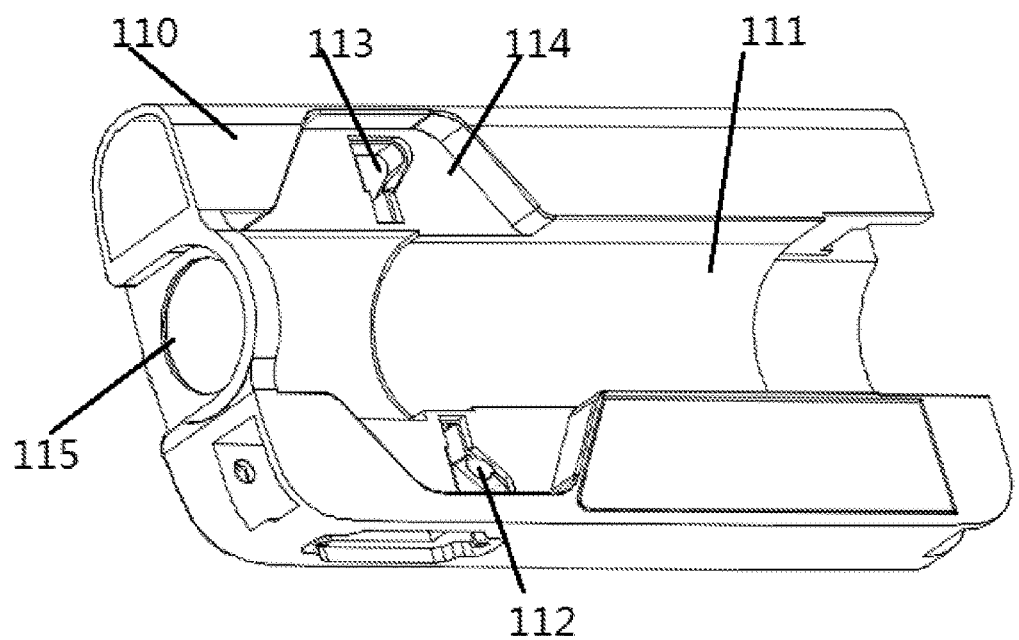
FIG. 4 shows the structural view of the inner lining.
Figure 5:
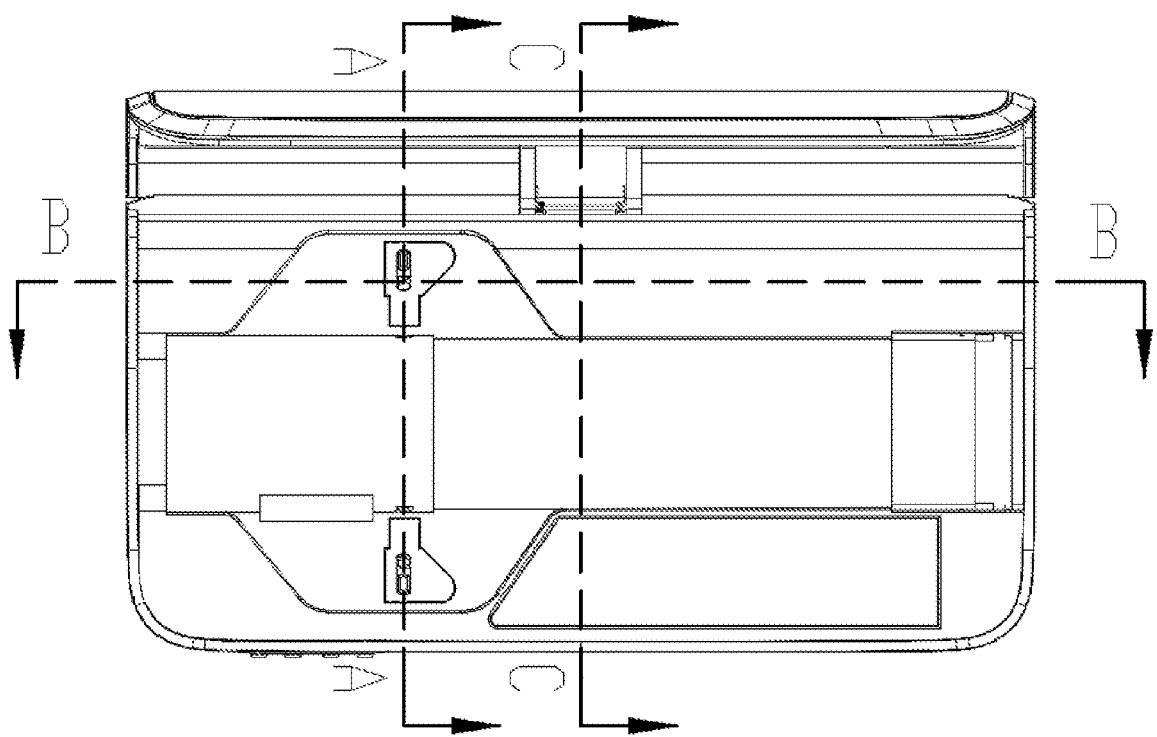
FIG. 5 shows the top view of the present invention.
Figure 6:
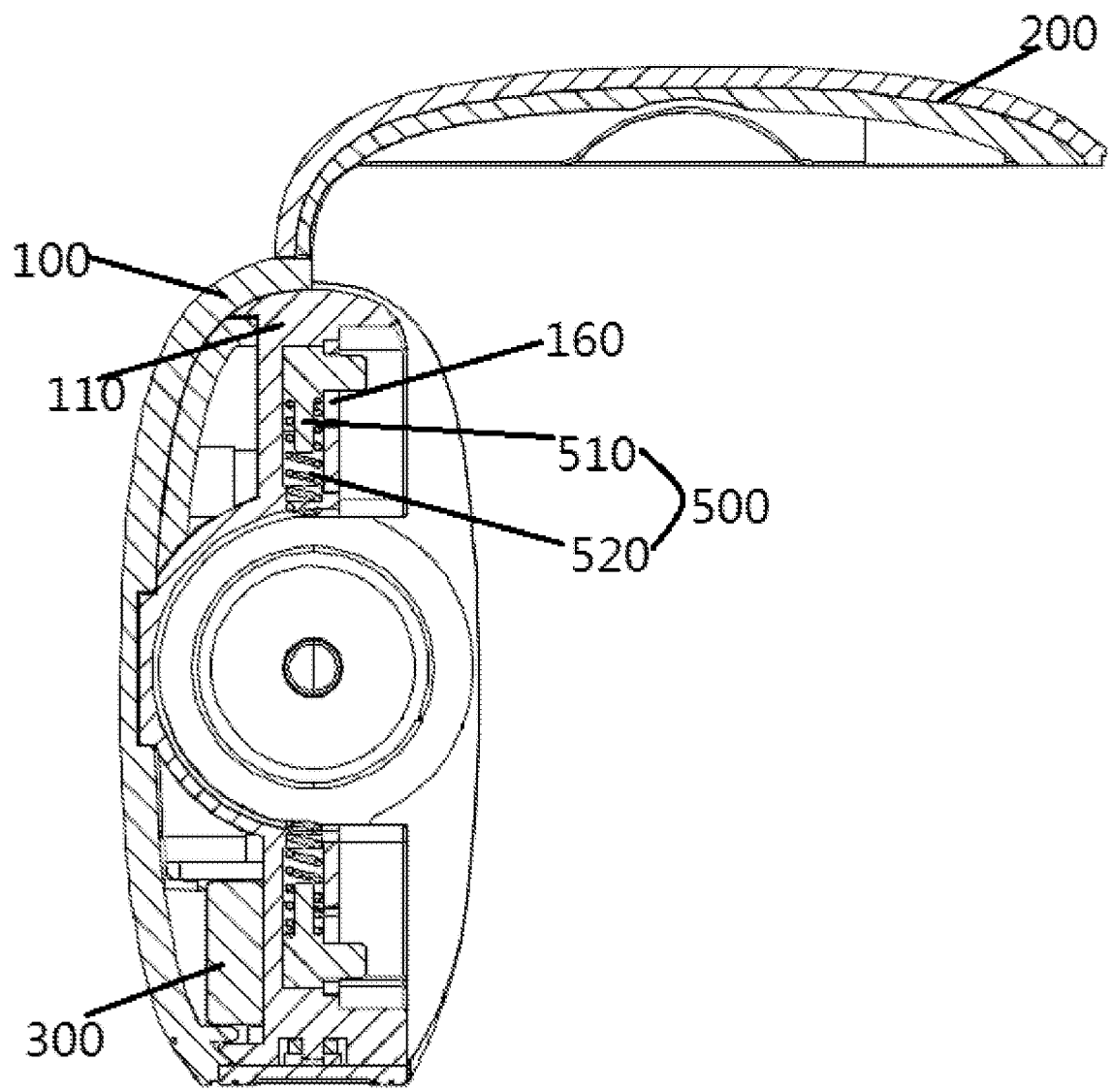
FIG. 6 shows the cross-section view of A-A in FIG. 5.
Figure 7:
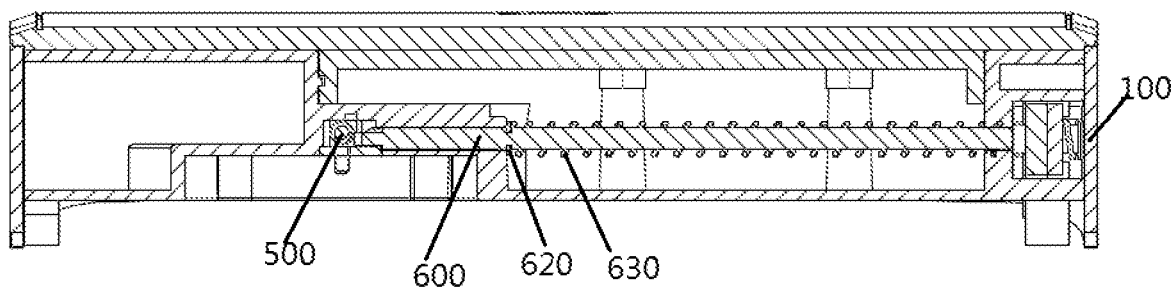
FIG. 7 shows the cross-section view of B-B in FIG. 5.

As illustrated in FIG. 4, in this embodiment, an opening part 115 is provided on a second end of the inner lining 110. The opening part 115 corresponds to a light-emitting end of the portable lighting device 900 in position, size and shape. The second end of the inner lining 110 is opposite to the first end thereof. A light-emitting area 160 is provided on a sidewall of the case 100 accordingly. With the presence of the opening part 115, light produced from the portable lighting device 900 can be projected by sequentially passing through the opening part 115 and the light-emitting area 160; therefore, the portable lighting device 900 can be used while charging in the charging case, thereby enhancing the convenience of the portable lighting device 900 during use.

In this embodiment, a control switch 130 is provided on the case 100. The control switch 130 is signally connected to the magnetic charging device 400 to allow the control switch 130 to control operation of the portable lighting device 900 stored in the case 100.

When in use, after the portable lighting device 900 is placed in the charging case, the portable lighting device 900 electrically conducts with the magnetic charging device 400, and the control switch 130 electrically conducts with the magnetic charging device 400, so that the control switch 130 can control operation of the portable lighting device 900 through controlling the magnetic charging device 400.

In this embodiment, when the portable lighting device 900 is put into the case 100 for charging, the light-emitting end of the portable lighting device 900 produces a large amount of heat, causing the temperature inside the case 100 to rise. In view of this, the case 100 is further provided with a temperature sensor 170 for sensing temperature inside the case 100. The temperature sensor 170 is signally connected to the magnetic charging device 400. If the temperature is too high, the temperature sensor can send the temperature signal detected to the magnetic charging device 400, so that the magnetic charging device 400 can control the working status of the portable lighting device 900 or adjust the working level of the portable lighting device 900.

As illustrated in FIG. 1, in this embodiment, a buffer unit 140 is further provided in the storage space 111. The buffer unit 140 is located at the opening part 115. With the presence of the buffer unit 140, the risk of damaging the head of the portable lighting device 900 can be reduced. In this embodiment, the buffer unit 140 is made of heat-resistant foam.

As illustrated in FIG. 1, in this embodiment, one end of the lid 200 which is away from the case 100 is provided with a first magnetic part 210; a second magnetic part 150 is correspondingly provided on the case 100. The first magnetic part 210 and the second magnetic part 150 have opposite magnetic poles. The first magnetic part 210 and the second magnetic part 150 cooperate with each other so that the lid 200 closes on the case 100. In this embodiment, the first magnetic part 210 and the second magnetic part 150 are both magnets. The first magnetic part 210 and the second magnetic part 150 facilitate users to open or close the lid 200, thereby improving the convenience of usage of the charging case.

Figure 8:
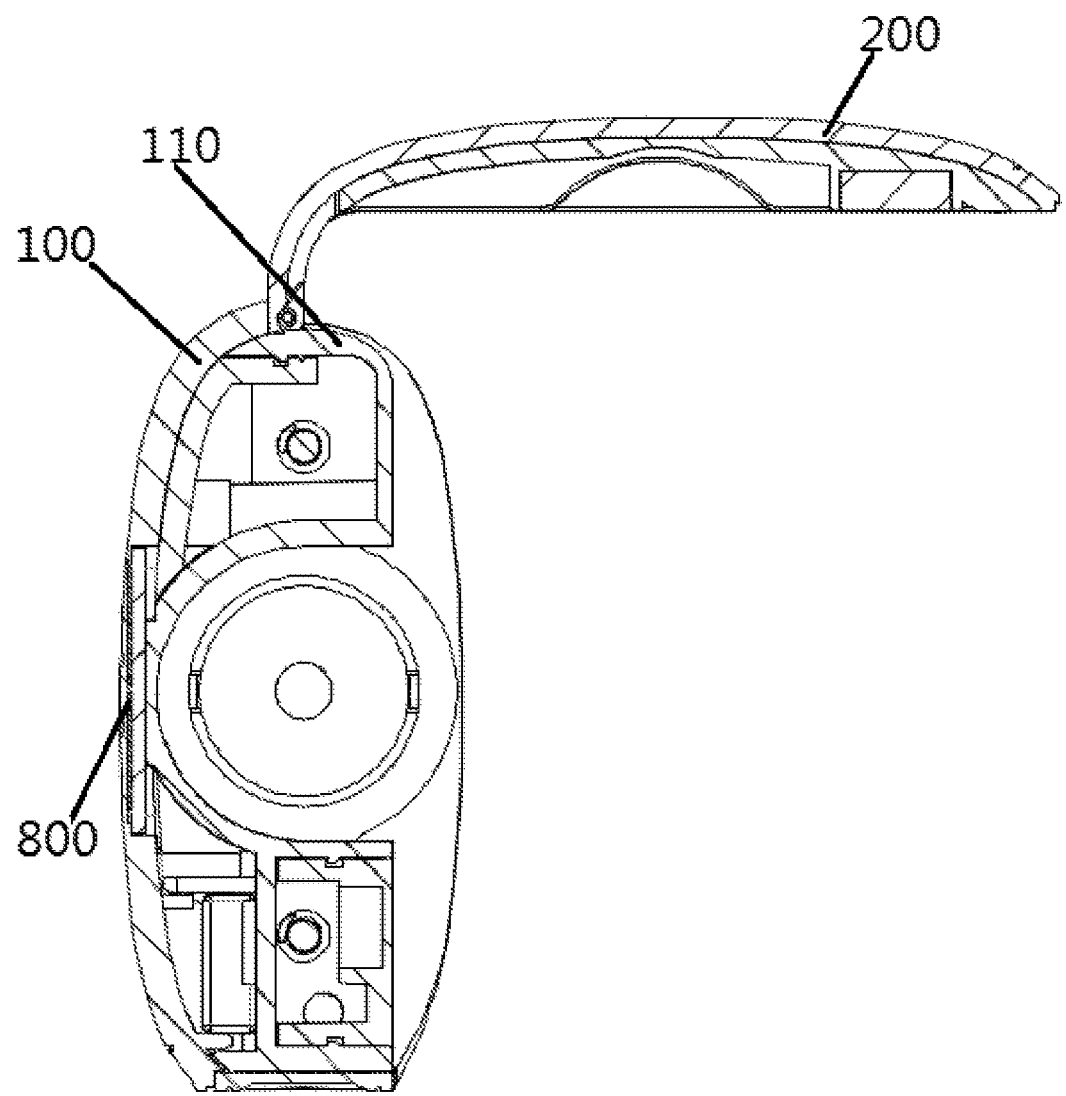
FIG. 8 shows the cross-section view of C-C in FIG. 5.

As illustrated in FIG. 8, in this embodiment, a wireless charging component 800 is further provided in the case 100 for charging the case 100. The wireless charging component 800 allows users to directly charge the charging case by placing it on a wireless charger, thereby further improving the convenience of usage of the charging case.

In this embodiment, the energy storage device 300 is a battery, the first elastic component 700 and the second elastic component 520 are springs.

Principle of operation: When charging the portable lighting device 900, push the moving parts 512 so that the sliding pieces 510 move towards the inner side of the storage space 111. At this time, the first inclining parts 511 move towards the push rods 600 and press against the second inclining parts 610, and the push rods 600 push the magnetic charging device 400 away from the opening part 115. Then, place the portable lighting device 900 into the storage space 111 and release the unlocking assemblies 500. Under action of the first elastic component 700, the magnetic charging device 400 returns to its original position; at this time, the push rods 600 returns to their original positions under action of the magnetic charging device 400 and the third elastic components 630, and the electric contact point of the magnetic charging device 400 is in contact with the charging end of the portable lighting device 900 and hence electrically conducts with the portable lighting device 900. The charging case can therefore charge the portable lighting device 900;

To take out the portable lighting device 900, push the moving parts 512 so that the sliding pieces 510 move towards the inner side of the storage space 111. At this time, the first inclining parts 511 move towards the push rods 600 and press against the second inclining parts 610, and the push rods 600 push the magnetic charging device 400 away from the opening part 115, thereby disconnecting the magnetic charging device 400 from the portable lighting device 900. The portable lighting device 900 can then be taken out from the storage space 111.

The above embodiment is only one of the preferred embodiments of the present invention. General changes or replacements made by a person skilled in this field of art in accordance with the scope of teachings of the present invention should also fall within the scope of protection of the present invention.

What is claimed is:

1. A portable charging case, characterized in that, it comprises:
   a case (100);
   an inner lining (110) provided with a storage space (111) for receiving a portable lighting device (900) provided along a longitudinal direction thereof;
   a lid (200) provided on the case (100) in an openable and closable manner;
   an energy storage device (300) installed in the case (100) for supplying electricity to the portable lighting device (900);
   a magnetic charging device (400) installed in the case (100) by mean of a first elastic component (700) and located at a first end of the inner lining (110);
   a pair of unlocking assemblies (500) movably installed on the inner lining (110) and located on two sides of the storage space (111) respectively; the unlocking assemblies (500) can move towards an inner side of the storage space (111) under external force;
   a pair of push rods (600) movably installed in a pair of through holes (112) at two sides of the inner lining (110) respectively along the longitudinal direction of the inner lining (110), and the push rods (600) each has a first end which is close to the unlocking assemblies (500) and a second end which can press against the magnetic charging device (400); the first end and the second end of each of the push rods (600) are opposite to each other;

wherein, when the unlocking assemblies (500) are pushed, the unlocking assemblies (500) can press against the push rods (600) to push the magnetic charging device (400) to move away from the portable lighting device (900).

2. The portable charging case as in claim 1, characterized in that: the unlocking assemblies (500) each comprises a sliding piece (510) and a second elastic component (520); a pair of installation slots (113) are provided on the inner lining (110); a side of each of the sliding pieces (510) which is near to the storage space (111) is fixed to a side wall of a respective one of the installation slots (113) by means of a respective one of the second elastic components (520), thereby allowing the sliding piece (510) to move towards the storage space (111) under external force.

3. The portable charging case as in claim 2, characterized in that: a first inclining part (511) is extended from each of the sliding pieces (510) towards the push rods (600); correspondingly, a second inclining part (610) is provided at the first end of each of the push rods (600) which is close to the sliding pieces (510); wherein, when the sliding pieces (510) are pushed towards the storage space (111), the first inclining parts (511) can press against the second inclining parts (610) to allow the push rods (600) to push the magnetic charging device (400) away from the portable lighting device (900).

4. The portable charging case as in claim 2, characterized in that: a pair of recessed areas (114) are provided on the inner lining (110); the recessed areas (114) are located at the two sides of the storage space (111); the installation slots (113) are located in the recessed areas (114).

5. The portable charging case as in claim 1, characterized in that: an opening part (115) is provided on a second end of the inner lining (110); the opening part (115) corresponds to a light-emitting end of the portable lighting device (900) in position, size and shape; the second end of the inner lining (110) is opposite to the first end thereof.

6. The portable charging case as in claim 5, characterized in that: a control switch (130) is provided on the case (100); the control switch (130) is signally connected to the magnetic charging device (400) to allow the control switch (130) to control operation of the portable lighting device (900) stored in the case (100).

7. The portable charging case as in claim 6, characterized in that: the case (100) is further provided with a temperature sensor (170) for sensing temperature inside the case (100); the temperature sensor (170) is signally connected to the magnetic charging device (400).

8. The portable charging case as in claim 5, characterized in that: a buffer unit (140) is further provided in the storage space (111); the buffer unit (140) is located at the opening part (115).

9. The portable charging case as in claim 1, characterized in that: one end of the lid (200) which is away from the case (100) is provided with a first magnetic part (210); a second magnetic part (150) is correspondingly provided on the case (100); the first magnetic part (210) and the second magnetic part (150) cooperate with each other so that the lid (200) closes on the case (100).

10. The portable charging case as claim 1, characterized in that: a circlip (620) is fixed on each of the push rods (600); each of the push rods (600) is further sleeved with a third elastic component (630); each of the third elastic components (630) has a first end which is fixed to a respective one of the circlips (620) and a second end which is fixed to an inner wall of a respective one of the through holes (112).

* * * * *